US012197161B2

(12) United States Patent
Kamiyama et al.

(10) Patent No.: US 12,197,161 B2
(45) Date of Patent: Jan. 14, 2025

(54) CLEANING BLADE

(71) Applicant: NOK CORPORATION, Tokyo (JP)

(72) Inventors: Junya Kamiyama, Fujisawa (JP); Yoichi Hagi, Kitaibaraki (JP); Kenji Sasaki, Fujisawa (JP); Satoshi Fukuoka, Fujisawa (JP); Satoshi Nakakita, Fujisawa (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/268,432

(22) PCT Filed: Dec. 3, 2021

(86) PCT No.: PCT/JP2021/044521

§ 371 (c)(1),
(2) Date: Jun. 20, 2023

(87) PCT Pub. No.: WO2022/138076

PCT Pub. Date: Jun. 30, 2022

(65) Prior Publication Data

US 2024/0310775 A1 Sep. 19, 2024

(30) Foreign Application Priority Data

Dec. 25, 2020 (JP) ................................ 2020-216514

(51) Int. Cl.
*G03G 21/10* (2006.01)

(52) U.S. Cl.
CPC .................................. *G03G 21/10* (2013.01)

(58) Field of Classification Search
CPC .......... G03G 21/0005; G03G 21/0011; G03G 21/0017; G03G 21/10; G03G 2221/0005; G03G 2221/0026; G03G 2221/0068; G03G 2221/0089
See application file for complete search history.

(56) References Cited

U.S. PATENT DOCUMENTS 10,514,651 B1 12/2019 Watanabe et al.
2007/0201917 A1* 8/2007 Teshigawara ...... G03G 21/0017 399/350

(Continued)

FOREIGN PATENT DOCUMENTS

JP H11-119620 A 4/1999
JP 2007034248 A * 2/2007 ......... G03G 21/0017

(Continued)

OTHER PUBLICATIONS

International Search Report of the ISA issued in PCT/JP2021/044521, Dated Feb. 1, 2022; ISA/JP. (5 pages).

(Continued)

*Primary Examiner* — Thomas S Giampaolo, II

(74) *Attorney, Agent, or Firm* — Harness, Dickey & Pierce, P.L.C.

(57) ABSTRACT

A cleaning blade includes a tip end adapted to contact a photoconductor member. The tip end is formed of polyurethane having tan δ of greater than or equal to 0.35 under an environment of 23° C., a loss elastic modulus of greater than or equal to 5.59 MPa under an environment of 23° C., and a rebound resilience of less than or equal to 21% under an environment of 23° C.

6 Claims, 3 Drawing Sheets

(56) References Cited

U.S. PATENT DOCUMENTS

| | | | | |
|---|---|---|---|---|
| 2011/0021721 | A1* | 1/2011 | Masumoto | C08G 18/4238 525/440.01 |
| 2014/0153987 | A1 | 6/2014 | Jeong et al. | |
| 2018/0173153 | A1* | 6/2018 | Kanno | G03G 21/0017 |
| 2019/0011872 | A1 | 1/2019 | Kawabata et al. | |

FOREIGN PATENT DOCUMENTS

| | | | |
|---|---|---|---|
| JP | 2008-76512 | A | 4/2008 |
| JP | 2015-225164 | A | 12/2015 |
| JP | 2019-144383 | A | 8/2019 |
| JP | 2020-16766 | A | 1/2020 |
| WO | 2017/111061 | A1 | 6/2017 |

OTHER PUBLICATIONS

Notice of Reasons for Refusal issued in corresponding Japanese Patent Application No. 2022-572066 dated Mar. 12, 2024, with English translation (8 Pages).

* cited by examiner

| | Sample Number | 1 | 2 | 3 | 4 | 5 | 6 | 7 | 8 |
|---|---|---|---|---|---|---|---|---|---|
| Composition | Polyester Polyol (Molecular Weight: 2000) (Parts by Weight) | 100 | 100 | 100 | 100 | 100 | 100 | 100 | 100 |
| | Isocyanate: 4,4'-Diphenylmethane Diisocyanate (MDI) (Parts by Weight) | 59 | 51 | 55 | 43 | 55 | 44 | 43 | 37 |
| | Cross-Linking Agent: Trimethylolethane (TME) (Parts by Weight) | 4.96 | 4.68 | 4.01 | 1.85 | - | - | - | - |
| | Cross-Linking Agent: 1,1,1-Trimethylolpropane (TMP) (Parts by Weight) | - | - | - | - | 2.89 | 3.21 | 1.55 | 1.25 |
| | Chain Extender: 1,3-Propanediol (1,3PD) (Parts by Weight) | 8.75 | 6.67 | 8.48 | 7.02 | - | - | - | - |
| | Chain Extender: 1,4-Butanediol (1,4BD) (Parts by Weight) | - | - | - | - | 11.63 | 7.54 | 8.87 | 7.12 |
| Characteristics (Under Environment of 23°C) | Rebound Resilience (%) | 16 | 18 | 21 | 55 | 28 | 37 | 55 | 65 |
| | tanδ | 0.50 | 0.46 | 0.35 | 0.10 | 0.25 | 0.17 | 0.08 | 0.06 |
| | Loss Elastic Modulus (MPa) | 12.10 | 7.95 | 5.59 | 1.03 | 6.00 | 1.40 | 1.08 | 0.60 |
| | Storage Elastic Modulus (MPa) | 24.11 | 17.13 | 16.16 | 10.10 | 24.22 | 8.33 | 13.85 | 10.85 |
| | Wear Amount (μm²) | 15 | 29 | 16 | 43 | 31 | 40 | 52 | 59 |

*Fig.2*

CLEANING BLADE

CROSS REFERENCE TO RELATED APPLICATIONS

The present application is a national phase application of International Patent Application No. PCT/JP2021/044521 filed on Dec. 3, 2021, which claims the benefit of Japanese Patent Application No. 2020-216514, filed on Dec. 25, 2020. The contents of the above applications are incorporated herein by reference in their entireties.

BACKGROUND

Technical Field

The present disclosure relates to a cleaning blade for use in image-forming devices.

Related Art

In an image-forming device that uses electrophotography (for example, a copying machine or a printer), a toner image formed on the surface of a photoconductor drum is transferred to a sheet being moved. Portions of toner remaining on the surface of the photoconductor drum are removed with a cleaning blade.

The cleaning blade preferably has suitable elasticity that allows for moderate deformation of the cleaning blade, and suitable wear resistance to secure a long service life. Typically, cleaning blades are formed of a thermosetting polyurethane resin or a thermosetting polyurethane elastomer (see International Publication No. WO 2017/111061).

In an image-forming device, a photoconductor drum and its peripheral components are often provided as a single unit. In such a case, the service life of the unit is determined by a component with the shortest service life. A cleaning blade is a component with a short service life. It is desired that the service life of the cleaning blade be further prolonged.

The present disclosure provides a cleaning blade with a further longer service life.

SUMMARY

An aspect of the present disclosure provides a cleaning blade. The cleaning blade includes a tip end adapted to contact a photoconductor member. The tip end is formed of polyurethane having tan δ of greater than or equal to 0.35 under an environment of 23° C., a loss elastic modulus of greater than or equal to 5.59 MPa under an environment of 23° C., and a rebound resilience of less than or equal to 21% under an environment of 23° C.

According to such an aspect, the wear resistance of the tip end of the cleaning blade can be improved, and the service life of the cleaning blade can thus be prolonged.

BRIEF DESCRIPTION OF THE DRAWINGS

FIG. 2 is a table illustrating the characteristics and test results of samples produced to examine a preferred range of the present disclosure.

DETAILED DESCRIPTION

Hereinafter, an embodiment according to the present disclosure will be described with reference to the accompanying drawings. The scale of the drawings is not necessarily accurate, and some of the features may be exaggerated or omitted.

Figure 1:
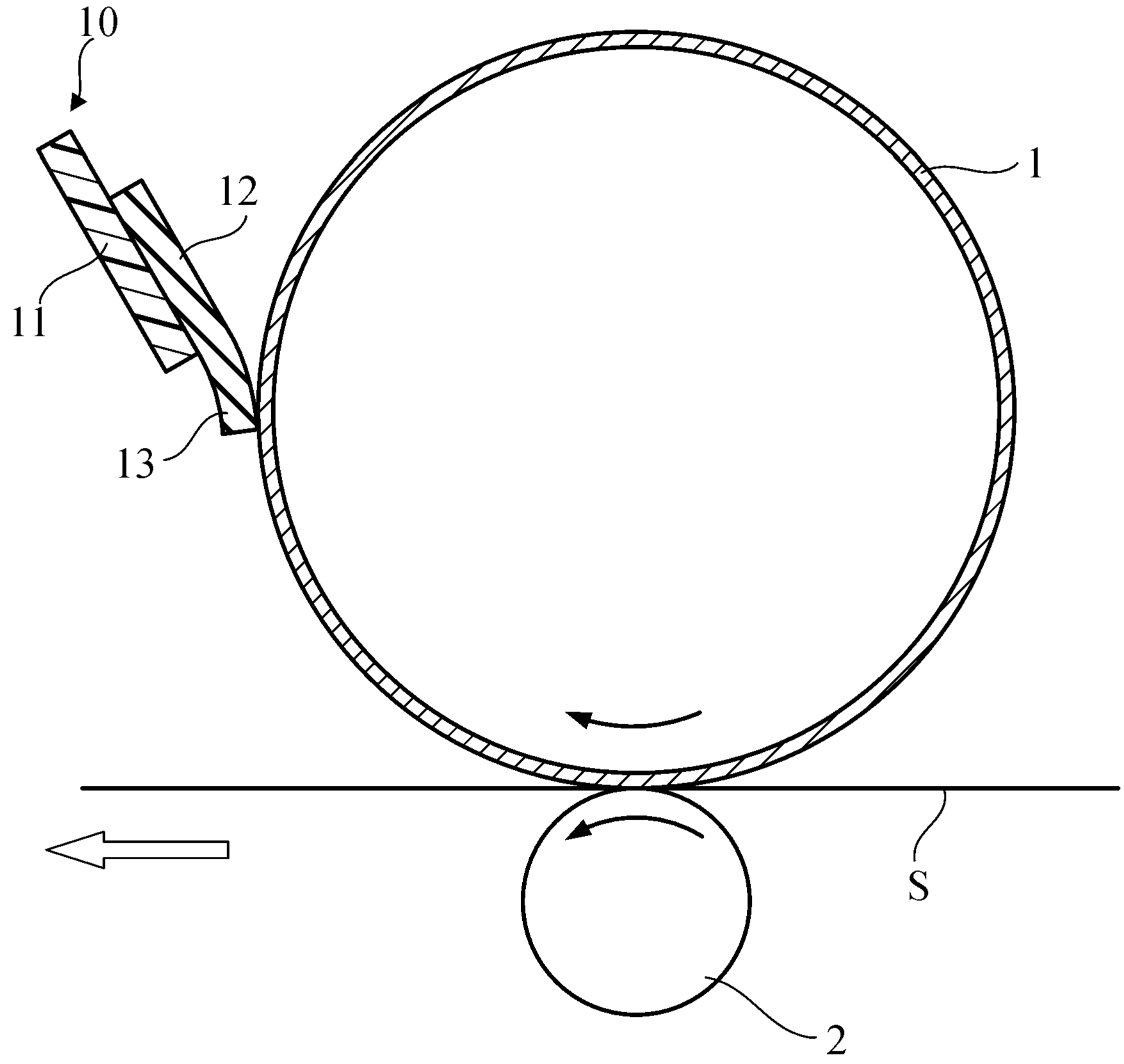
FIG. 1 is a view illustrating a cleaning blade in use according to an embodiment of the present disclosure.

As illustrated in FIG. 1, a cleaning blade 10 according to an embodiment is disposed near a photoconductor drum (i.e., a photoconductor member) 1 of an image-forming device that uses electrophotography. As is well known, a transfer device 2 is disposed near the photoconductor drum 1. While a sheet S of paper carried by a carrier device (not illustrated) is passing through a nip between the photoconductor drum 1 and the transfer device 2, a toner image formed on the photoconductor drum 1 is transferred to the sheet S.

Portions of toner that remain on the surface of the photoconductor drum 1 without being transferred to the sheet S are removed by the cleaning blade 10. The image-forming device includes many other components as is well known by one of ordinary skill in the art, but the description of such components is omitted herein.

The cleaning blade 10 includes a bracket (i.e., a support member) 11 made of hard plastic or metal, and an elastic member 12 fixed to the bracket 11. Both the bracket 11 and the elastic member 12 extend in parallel with the axial direction of the photoconductor drum 1. The bracket 11 is fixed in place in the image-forming device, and supports the elastic member 12. The bracket 11 has high rigidity, whereas the elastic member 12 has moderate elasticity. A tip end 13 of the elastic member 12 is brought into contact with the outer peripheral surface of the photoconductor drum 1. The tip end 13 in contact with the photoconductor drum 1 scrapes off the portions of the toner remaining on the photoconductor drum 1. Upon receiving a reaction force from the photoconductor drum 1, the elastic member 12, in particular, the tip end 13 thereof is elastically deformed.

It is desirable to improve the wear resistance of the tip end 13 of the cleaning blade 10, and thus prolong the service life of the cleaning blade 10. The Applicant prepared a number of elastic members 12 as samples, and measured the characteristics of the samples to perform wear tests.

FIG. 2 illustrates the materials and the characteristics of each sample.

Each of the elastic members 12 produced as the samples contained polyurethane. Ester polyol (molecular weight: 2000) was used as polyol. 4,4'-diphenylmethane diisocyanate (MDI), which is "MILLIONATE MT" manufactured by Tosoh Corporation (Tokyo, Japan), was used as isocyanate. Trimethylolethane (TME) and 1,1,1-trimethylolpropane (TMP), which are both manufactured by Koei Chemical Industry Co., Ltd. (Tokyo, Japan), were used as cross-linking agents. 1,3-propanediol (1,3PD) and 1,4-butanediol (1,4BD), which are both manufactured by Mitsubishi Chemical Corporation (Tokyo, Japan), were used as chain extenders.

Rebound resilience, loss elastic modulus, and storage elastic modulus were measured at a temperature of 23° C. and a humidity of 55% R.H.

The rebound resilience was measured using a Lupke rebound resilience tester ("VR-6512" manufactured by Ueshima Seisakusho Co., Ltd. (Tokyo, Japan)) compliant with JIS K 6255 (2013).

The loss elastic modulus and the storage elastic modulus were measured on a test piece produced for each sample to measure the elastic moduli. The test piece had a thickness of 2 mm, a width of 3 mm, and a gauge length of 20 mm.

Each test piece was caused to deform at an amplitude of 2 μm and a frequency of 10 Hz so that a phase difference between dynamic stress and dynamic strain was measured. The measuring machine used was "Rheogel-E4000HP" manufactured by UBM Co. Ltd. (Kyoto, Japan). The strain was applied to a publicly known formula to calculate the loss elastic modulus and the storage elastic modulus. The viscosity/elasticity ratio (tan δ) was obtained by dividing the loss elastic modulus by the storage elastic modulus.

Figure 3:
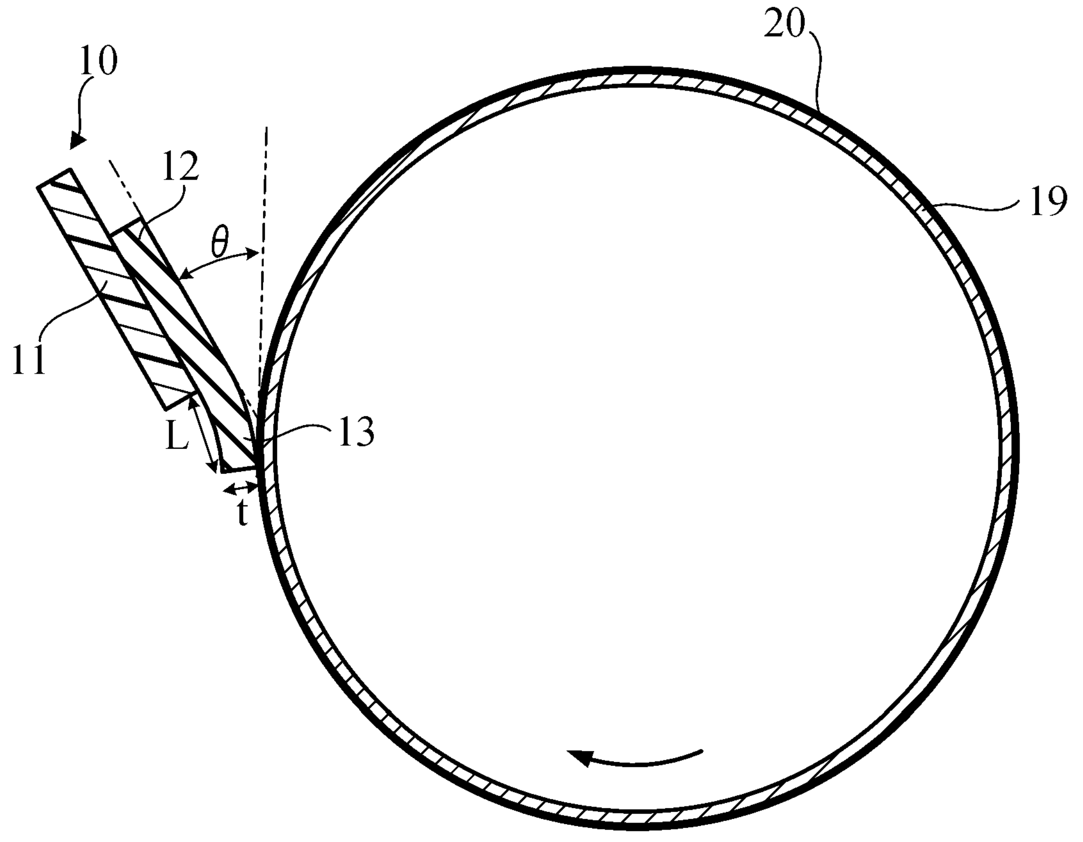
FIG. 3 illustrates a view of a wear test performed on the cleaning blade to examine a preferred range of the present disclosure.

The wear amount was measured through the following experiment. The wear amount was also measured at a temperature of 23° C. and a humidity of 55% R. H. As illustrated in FIG. 3, the length L of a protruding portion of the elastic member 12 as the sample protruding beyond an end of the bracket 11 was found to be 9 mm, and the thickness t of the protruding portion was found to be 2 mm. Note that the length L was measured with the elastic member 12 in the straight position.

As illustrated in FIG. 3, a lapping film 20 with a thickness of 0.3 μm was wrapped around the outer periphery of a rotatable cylinder 19. The cylinder 19 is a cylinder of a glass material with a surface coated with polycarbonate, and was formed to simulate the photoconductor drum 1. The lapping film 20 used was an "abrasive lapping film #15000 A3-0.3SHT" available from 3M Japan Limited (Tokyo, Japan). The reason for wrapping the lapping film 20 around the cylinder 19 was to accelerate the wear of the tip end 13 of the elastic member 12 with a polishing agent.

Next, the elastic member 12 of the cleaning blade 10 was brought into contact with the cylinder 19, which has the lapping film 20 wrapped therearound, at a contact angle θ and a contact load of 0.18 N/cm. The contact angle θ was 20 degrees. Then, the photoconductor drum 1 was rotated at a circumferential speed of 460 mm/s so that the photoconductor drum 1 was slid against the elastic member 12 over a distance of 1485 mm (which corresponds to the total length of five sheets of A4 paper).

Figure 4:
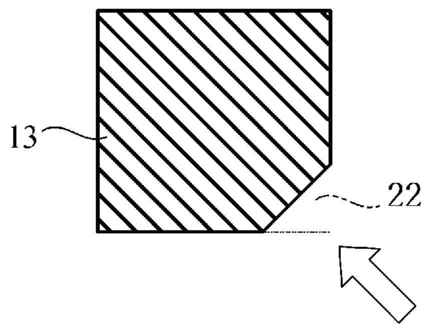
FIG. 4 illustrates a view of the measurement of wear of the cleaning blade.

Then, the wear amount of the tip end 13 of the elastic member 12 was measured. To measure the wear amount, an edge of the tip end 13 was imaged using a laser microscope "VK-X250" of KEYENCE CORPORATION (Osaka, Japan) and using an objective lens with a magnification of 150 times. Then, the area of a worn part 22 in the captured image was calculated. The imaging direction was inclined with respect to the longitudinal direction of the elastic member 12 (an arrow in FIG. 4 indicates the imaging direction), but it was possible to calculate the area of the worn part 22 orthogonal to the longitudinal direction of the elastic member 12 by correcting the inclination through calculation. Imaging was performed on three portions of the elastic member in the longitudinal direction. FIG. 2 illustrates the average value of the areas obtained for the three portions.

From the test results, it was found that the wear amounts of Samples 1 to 3 are very small, whereas those of Samples 4 to 8 are large.

Therefore, at least the tip end 13 of the elastic member 12 is preferably formed of polyurethane with a viscosity/elasticity ratio (tan δ) of greater than or equal to 0.35 under an environment of 23° C., a loss elastic modulus of greater than or equal to 5.59 MPa under an environment of 23° C., and a rebound resilience of less than or equal to 21% under an environment of 23° C. The tip end 13 with such characteristics has high absorbency for impacts or vibration because of its low rebound resilience. In addition, the tip end 13 has a high capability of radiating thermal energy due to friction energy, which is generated upon sliding against the photoconductor drum 1, because of its high viscosity/elasticity ratio (tan δ), and thus has high wear resistance. Therefore, the service life of the cleaning blade 10 can be prolonged.

Although the present disclosure has been described by way of its preferred embodiment with reference to the drawings, one of ordinary skill in the art would understan δ that changes to the form and the details of the disclosure are possible without departing from the scope of the claimed disclosure. Such changes, alterations, and modifications should be encompassed within the scope of the present disclosure.

For example, in the foregoing embodiment, the cleaning blade is adapted to contact the outer peripheral surface of the photoconductor drum 1 to clean the photoconductor drum 1. However, the cleaning blade according to the present disclosure may contact a photoconductor belt wrapped around a plurality of rolls to clean the belt instead of the photoconductor drum 1.

What is claimed is:

1. A cleaning blade comprising a tip end adapted to contact a photoconductor member, wherein the tip end is formed of polyurethane having tan δ of greater than or equal to 0.35 under an environment of 23° C., a loss elastic modulus of greater than or equal to 5.59 MPa under an environment of 23° C., and a rebound resilience of less than or equal to 21% under an environment of 23° C.

2. The cleaning blade according to claim 1, wherein the polyurethane has tan δ of less than or equal to 0.50.

3. The cleaning blade according to claim 1, wherein the polyurethane has the loss elastic modulus of less than or equal to 12.10 MPa.

4. The cleaning blade according to claim 1, wherein the polyurethane has the rebound resilience of greater than or equal to 16%.

5. The cleaning blade according to claim 1, wherein trimethylolethane is used for the polyurethane as cross-linking agents.

6. The cleaning blade according to claim 1, wherein 1,3-propanediol is used for the polyurethane as chain extenders.

* * * * *